(12) United States Patent
Raymond et al.

(10) Patent No.: US 11,892,376 B2
(45) Date of Patent: *Feb. 6, 2024

(54) SYSTEM FOR PRESSURE MONITORING AND PROCESSING LEAKAGE DETERMINATION OF A BLADDER

(71) Applicant: Stryker Corporation, Kalamazoo, MI (US)

(72) Inventors: Justin Raymond, Portage, MI (US); Darcy Richard Wank, Richland, MI (US); Michael John Olson, Kalamazoo, MI (US); Anuj K. Sidhu, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 378 days.

This patent is subject to a terminal disclaimer.

(21) Appl. No.: 16/389,165

(22) Filed: Apr. 19, 2019

(65) Prior Publication Data

US 2019/0242778 A1 Aug. 8, 2019

Related U.S. Application Data

(63) Continuation of application No. 15/196,100, filed on Jun. 29, 2016, now Pat. No. 10,267,706.

(Continued)

(51) Int. Cl.
*G01M 3/32* (2006.01)
*A47C 27/08* (2006.01)

(52) U.S. Cl.
CPC ......... *G01M 3/3272* (2013.01); *A47C 27/082* (2013.01); *A47C 27/083* (2013.01); *G01M 3/3218* (2013.01)

(58) Field of Classification Search
CPC . G01M 3/3272; G01M 3/3218; A47C 27/082; A47C 27/083

(Continued)

(56) References Cited

U.S. PATENT DOCUMENTS 5,235,713 A * 8/1993 Guthrie .................. A61G 7/057
5/713
5,546,789 A * 8/1996 Balke .................. G01M 3/3281
73/40

(Continued)

FOREIGN PATENT DOCUMENTS

CN 102551785 A * 7/2012
CN 105784079 A * 7/2016

(Continued)

OTHER PUBLICATIONS

Translation JP-2009142387-A (Year: 2009).*
Translation for CN-105784079-A (Year: 2014).*
Translation CN_102551785 (Year: 2012).*

*Primary Examiner* — Mischita L Henson
*Assistant Examiner* — Monica S Young
(74) *Attorney, Agent, or Firm* — Warner Norcross + Judd LLP

(57) ABSTRACT

A method of diagnosing a pneumatic system that (1) pressurizes the system to a first inflation pressure, (2) ceases the pressurizing for a settling-in time period, (3) measures a settled-in pressure after the settling-in time period, (4) measures a decayed pressure after a decay time period, (5) determines a determined rate of decay of the pressure in the system over the decay time period, and (6) compares the determined rate of decay to a first stored decay rate.

14 Claims, 6 Drawing Sheets

Related U.S. Application Data

(60) Provisional application No. 62/186,765, filed on Jun. 30, 2015.

(58) Field of Classification Search
USPC ........................................ 73/49, 40
See application file for complete search history.

(56) References Cited

U.S. PATENT DOCUMENTS

| | | | | |
|---|---|---|---|---|
| 5,629,874 A * | 5/1997 | Mittal | ................... | B60C 23/003 |
| | | | | 152/415 |
| 5,815,864 A * | 10/1998 | Sloop | ................. | A61G 7/05769 |
| | | | | 5/713 |
| 5,848,450 A * | 12/1998 | Oexman | ............ | A61G 7/05769 |
| | | | | 5/713 |
| 2002/0100314 A1 * | 8/2002 | Docy | ................... | G01M 3/3209 |
| | | | | 73/49.2 |
| 2005/0109082 A1 * | 5/2005 | Stewart | ................... | G01M 3/26 |
| | | | | 73/40 |
| 2005/0241380 A1 * | 11/2005 | Welch | .................... | B60C 23/00 |
| | | | | 73/146 |
| 2006/0010961 A1 * | 1/2006 | Gibson | ............... | B60C 23/0408 |
| | | | | 73/40 |
| 2007/0169543 A1 * | 7/2007 | Fazekas | ............... | G01M 3/2815 |
| | | | | 73/49.2 |
| 2008/0189865 A1 * | 8/2008 | Bhai | ...................... | A61B 5/1115 |
| | | | | 5/706 |
| 2008/0202213 A1 * | 8/2008 | Villers | ................ | G01M 3/3272 |
| | | | | 73/49.3 |
| 2009/0100604 A1 * | 4/2009 | Caminade | .......... | A61G 7/05776 |
| | | | | 5/713 |
| 2010/0206051 A1 * | 8/2010 | Mahoney | ............. | G01M 3/3218 |
| | | | | 73/40 |
| 2014/0007656 A1 | 1/2014 | Mahoney | | |
| 2014/0059781 A1 * | 3/2014 | Lafleche | ............... | A47C 27/083 |
| | | | | 5/713 |
| 2014/0277778 A1 * | 9/2014 | Nunn | ..................... | A47C 27/10 |
| | | | | 700/282 |
| 2015/0164236 A1 * | 6/2015 | Driscoll, Jr. | ......... | A47C 27/082 |
| | | | | 5/713 |
| 2017/0035212 A1 * | 2/2017 | Erko | .................... | A47C 27/082 |

FOREIGN PATENT DOCUMENTS

| | | | |
|---|---|---|---|
| JP | 2009142387 A | * | 7/2009 |
| JP | 2009142387 A | | 7/2009 |
| JP | 5296372 | | 9/2013 |

* cited by examiner

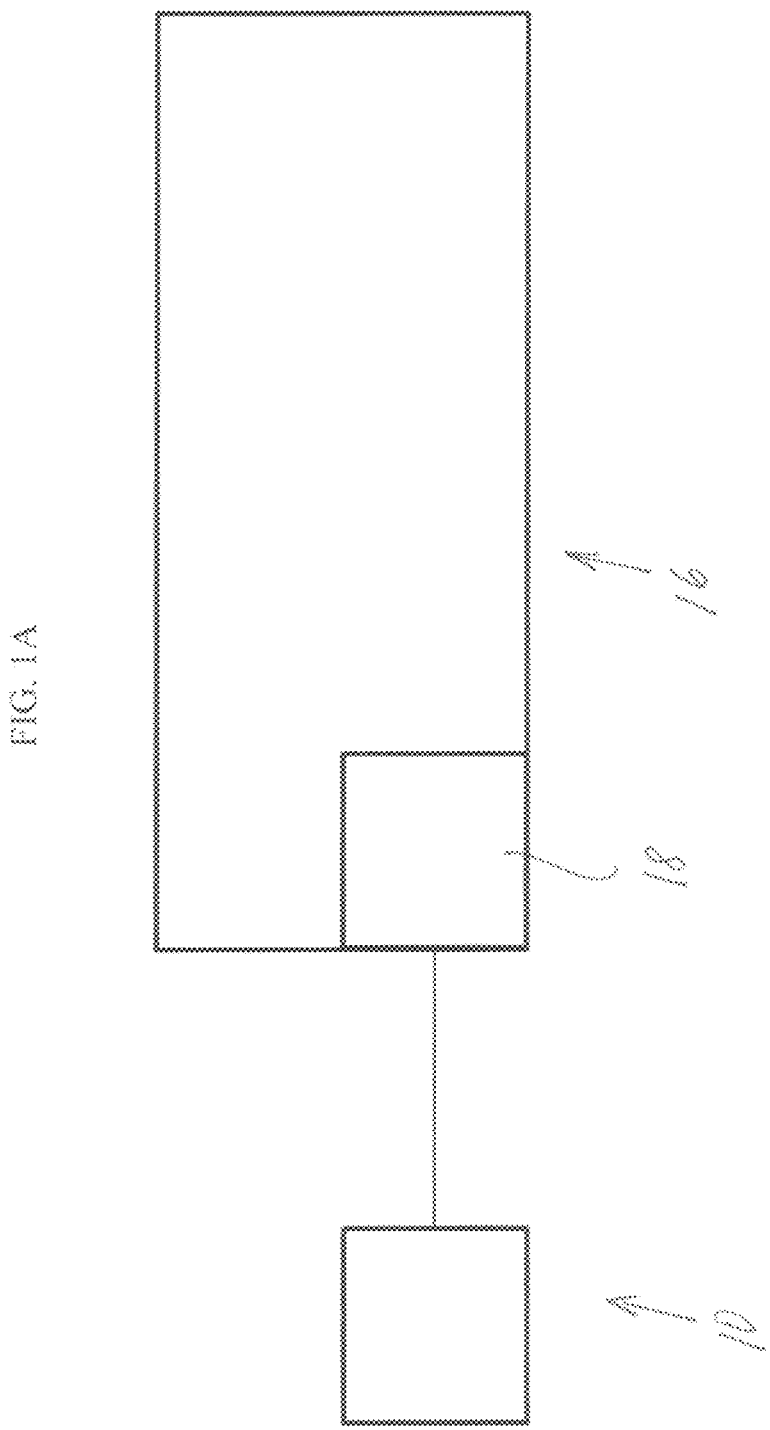

SYSTEM FOR PRESSURE MONITORING AND PROCESSING LEAKAGE DETERMINATION OF A BLADDER

This application is a continuation of U.S. patent application Ser. No. 15/196,100 filed Jun. 29, 2016 entitled PNEUMATIC DIAGNOSTIC METHOD AND SYSTEM FOR DETECTING LEAKAGE IN A PNEUMATIC SYSTEM, which claims benefit of U.S. provisional patent application Ser. No. 62/186,765 filed Jun. 30, 2015, by inventors Justin Raymond et al. and entitled DIAGNOSTIC SYSTEM, which are incorporated by reference herein in their entireties.

BACKGROUND OF THE INVENTION

Summary of the Invention

The present invention is directed to a diagnostic system for detecting leaks in a pneumatic system, such as a patient support surface, including a mattress.

In one embodiment, a method of diagnosing a pneumatic system comprises pressurizing the system to an inflation pressure, ceasing the pressurizing for a settling-in time period, measuring a decayed pressure after the settling-in time period, determining a determined rate of decay of the pressure in the system over a decay time period; and comparing the determined rate of decay to a first stored decay rate.

In one aspect, the pressurizing comprises inflating an inflatable component of the system.

In further aspect, the method further includes measuring a inflation time period for inflating the inflatable component to the inflation pressure.

According to yet a further aspect, the method further comprises comparing the inflation time period to a first stored time period. For example, the method determines whether the inflation time period is greater, equal or less than the first stored time period.

In addition, the method may comprise displaying (1) whether the determined rate of decay is greater, equal or less than the first stored decay rate and/or (2) whether the inflation time period is greater, equal, or less than the first stored time period.

In a further aspect, the method further comprises displaying a value representative of the determined rate of decay or the inflation time period.

In yet other aspects, the method further comprises deflating the inflatable component to a deflation pressure after detecting the decayed pressure. Optionally, a deflation time period for deflating the inflatable component to the deflation pressure is measured.

Additionally, the method may further comprise determining whether the deflation time period is greater, equal or less than a second stored time period.

In yet another aspect, the method further comprises displaying whether the deflation time period is greater, equal, or less than the second stored time period.

According to yet another aspect, the inflating the inflatable component comprises inflating a bladder of the pneumatic system. For example, the inflating the bladder may comprise inflating a zone of bladders of the pneumatic system. Additionally, the inflating the bladder may comprise inflating each zone of a plurality of zones of bladders of the pneumatic system.

In any of the above methods, the determining of the determined rate of decay may comprise measuring a settled-in pressure, and calculating the change in pressure between the settled-in pressure and the decayed pressure over the decay time period.

In any of the above methods, the method may further comprise determining whether the determined rate of decay is less than a second stored decay rate.

In a further aspect, the method further comprises displaying whether the determined rate of decay is greater, equal to or less than the first stored decay rate or the second stored decay rate.

According another embodiment, a pneumatic diagnostic system comprises a control system and software stored in one or more memory devices. The software is configured to control a fluid delivery device to pressurize a pneumatic system to an inflation pressure. The software is further configured to cease the pressurization for a settling time period and then detect the settled-in pressure in the pneumatic system based on one or more signals from the sensor at the end of a settling-in time period. The software then determines the rate of decay of the pressure in the pneumatic system over a decay time period and compares the determined rate of decay to a first stored decay rate.

In one aspect, the software is further configured to inflate an inflatable component of the pneumatic system to the inflation pressure.

In another aspect, the software is further configured to measure the inflation time period to inflate the inflatable component to the inflation pressure.

In yet another aspect, the software is further configured to compare the inflation time period to a first stored time period. For example, the software is configured to determining whether the inflation time period is greater, equal or less than the first stored time period.

According to yet another aspect, the pneumatic diagnostic system further comprises a display. The software is configured to show at said display indicating (1) whether the determined rate of decay is greater, equal or less than the first stored decay rate and/or (2) whether the inflation time period is greater, equal, or less than the first stored time period.

In another aspect, the software is configured to generate a display of the determined rate of decay or the inflation time period at said display.

In yet another aspect, the software is configured to measure a decayed pressure and to deflate the inflatable component to a deflation pressure after measuring the decayed pressure. Optionally, the software is further configured to measure the deflation time period for deflating the inflatable component to the deflation pressure. In addition, the software is further configured to determine whether the deflation time period is greater, equal or less than a second stored time period.

In other aspects, the software is further configured to generate a display indicating whether the deflation time period is greater, equal, or less than the second stored time period.

According to yet another aspect, the software is configured to inflate a bladder of the pneumatic system. Optionally, the software is configured to inflate a zone of bladders of the pneumatic system or each zone of a plurality of zones of bladders of the pneumatic system.

In other aspects, the software is configured to measure the decayed pressure in the system at the end of the decay time period and, further, calculate the determined rate of decay.

In any of the above diagnostic systems, the software may be configured to determine whether the determined rate of decay is greater, equal to or less than a second stored decay rate.

In any of the above diagnostic systems, the software may be configured to generate a display indicating whether the determined rate of decay is greater, equal to or less than the first or second stored decay rates.

In any of the above diagnostic systems, the diagnostic system may be combined with a mattress, which has one or more bladders, and the control system diagnoses the one or more bladders in the mattress. Further yet, the diagnostic system may be combined with a patient support that has a mattress.

BRIEF DESCRIPTION OF THE DRAWINGS

FIG. 1A is a schematic of another embodiment of the diagnostic system;

DETAILED DESCRIPTION OF THE EMBODIMENTS

Figure 1:
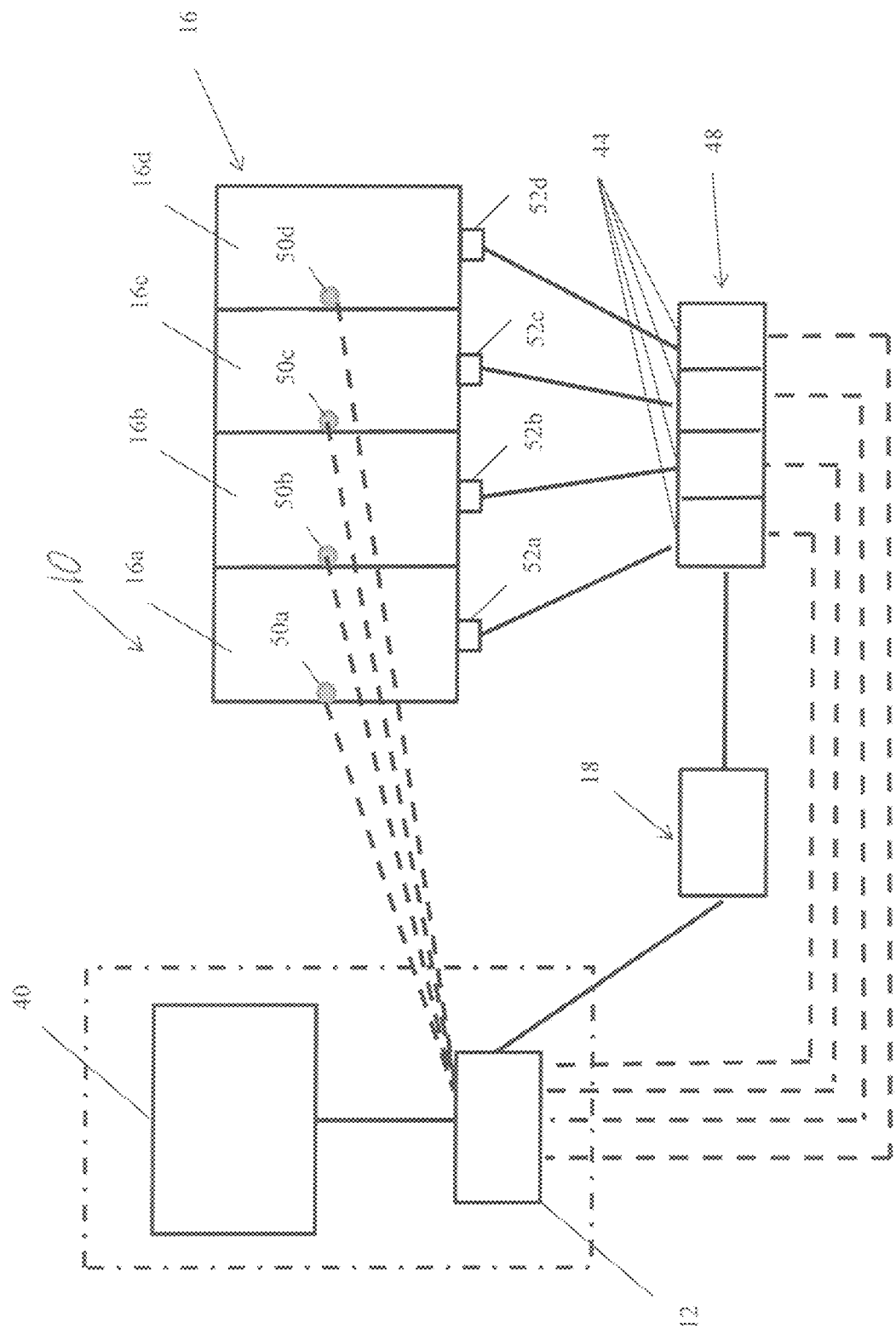
FIG. 1 is a schematic of a diagnostic system.

Referring to FIG. 1, the numeral 10 generally designates a diagnostic system. As will be more fully described below, diagnostic system 10 is configured to detect the pressure change in a pneumatic system, and moreover detect the pressure change over a period of time and/or determine how long the pneumatic system takes to reach a defined pressure, such as an inflation pressure or a deflation pressure. As such, diagnostic system may be used to detect leaks in a pneumatic system. The diagnostic system may be assembled as a modular system, including a modular system that can be incorporated into the pneumatic system or into an apparatus associated with the pneumatic system. Alternately, the modular system may be used in a manufacturing facility or used in the field by service technicians. Further yet, the system may be comprised of separate components that work together to be used as testing equipment, again for example, in a manufacturing facility or used in the field by service technicians.

Referring again to FIG. 1, diagnostic system 10 comprises a control system 12, which comprises a controller, memory in communication with the controller, and one or more peripheral interfaces in communication with the controller for communicating with the peripheral devices noted below, and software 14 stored in the memory of the control system. Optionally, control system 12 may comprise at least one transceiver to communicate either with the pneumatic system or with a remote device noted below. The components of control system 12 communicate with each other using conventional electronic communication techniques. In one embodiment, the controller communicates with memory, and the interface(s) using I-squared-C communications. Other types of serial or parallel communication can alternatively be used. In some other embodiments, different methods may be used for different components. For example, in one embodiment, the controller may communicate with the interface via a Controller Area Network (CAN) or Local Interconnect Network (LIN), while it communicates with memory using I squared C. It should be understood that other variations are possible.

The controller comprises one or more microcontrollers, microprocessors, and/or other programmable electronics that are programmed to carry out the functions described herein. It will be understood that the controller may also comprise other electronic components, not specifically mentioned herein, that are programmed to carry out the functions described herein, or that support the microcontrollers, microprocessors, and/or other electronics. The other electronic components comprise, but are not limited to, one or more field programmable gate arrays, systems on a chip, volatile or nonvolatile memory, discrete circuitry, integrated circuits, application specific integrated circuits (ASICs) and/ or other hardware, software, or firmware, as would be known to one of ordinary skill in the art. Such components can be physically configured in any suitable manner, such as by mounting them to one or more circuit boards, or arranging them in other manners, whether combined into a single unit or distributed across multiple units. Such components may be physically distributed in different positions on the diagnostic system, or they may reside in a common location on for example, on an apparatus incorporating the pneumatic system, such as the mattress or patient support apparatus noted below. When physically separated, the components may communicate using any suitable serial or parallel communication protocol, such as, but not limited to, CAN, LIN, Firewire, I-squared-C, RS-232, RS-485, etc.

Control system 12 is configured by software 14 to control the flow of fluid to and from components of a pneumatic system 16, and further to perform tests on the components of the pneumatic system to determine one or more parameters of the pneumatic system components, which may comprise detecting leaks or determining whether a component is functioning properly. The tests may be a one-time test or tests or may be set up to periodically test the pneumatic system components, as more fully described below. Further, depending on the parameters used in the comparisons noted below, the test(s) may be used to detect micro-leaks (which may reduce the life span of a pneumatic component) or large or gross leaks associate with a current or imminent failure.

In the illustrated embodiment, control system 12 is in communication with and controls (via software 14) a fluid flow control device, such as a pump 18, which selectively delivers fluid to and from the components of pneumatic system 16 based on signals from control system 12. Pump 18 may be a component of the diagnostic system or may be a component of the pneumatic system 16 (such as shown in FIG. 1A). Hence, diagnostic system 10 may be configured to use the existing flow control devices (e.g. pump, valves etc.) of the pneumatic system to run the pneumatic testing on the other components of the pneumatic system or use its own flow control device or devices.

Figure 2:
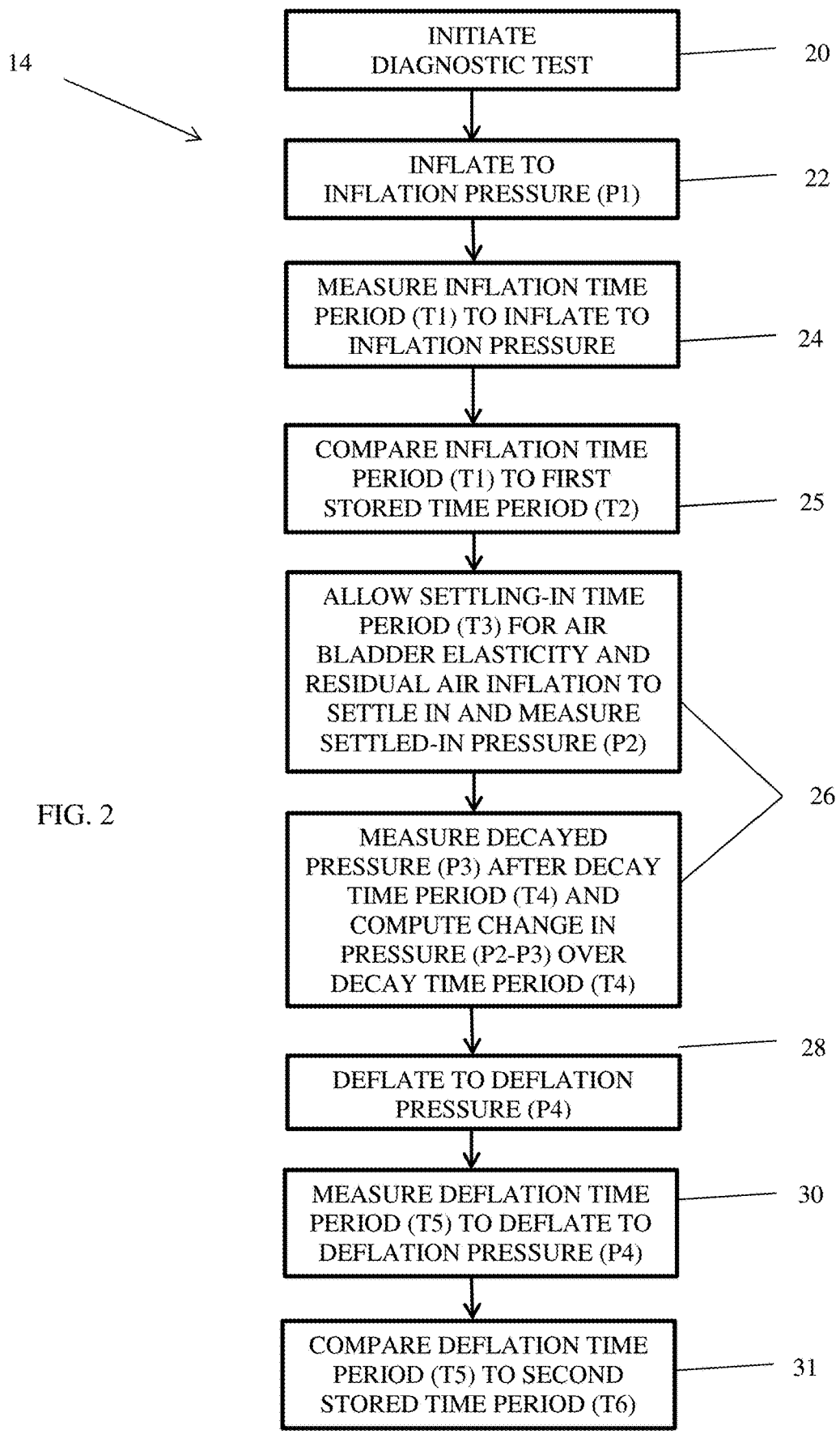
FIG. 2 is a flow chart illustrating the diagnostic process.

Referring to FIG. 2, control system 12, under the control of software 14, initiates a diagnostic test 20 by initially pressurizing or inflating the component or components of pneumatic system 14 to a specified inflation pressure P1 (22), for example, a maximum inflation pressure. In the illustrated embodiment, the components being pressurized are inflatable components, such as bladders of a mattress (which will be more fully described below). Hence the following description will be described in reference to inflating the components of the pneumatic system.

In one embodiment, control system 12 comprises a clock to measure the inflation time period T1 it takes to inflate the component to the inflation pressure P1 (24). The time it takes to inflate (or deflate noted below) may provide an indication of conduits being crossed or pinched. Control system 12 then compares the measured inflation time period T1 to an acceptable, first stored time period T2 (25). Time period T2 may be stored in the memory of control system 12 or stored in an external memory (not shown)), with which control system 12 may be in communication, for example, through one of its peripheral interfaces.

In another embodiment, control system 12 measures a settled-in pressure P2 in the component(s) of pneumatic system 16 after a settling-in time period T3 (26). Settling-in time period T3 provides a settling time so as to reduce, if not minimize, the effect of material elasticity that may be present in the component(s) of the pneumatic system, as will be more fully described below. For example, the mattress may comprise air bladders that are formed from a material that can stretch. Depending on the material elasticity of the bladder material, the degree of stretch can vary. It is expected for the mattresses with bladders referenced below, a suitable settling-in time period T3 may fall in a range of 30 seconds to several minutes. However, the settling-in time can be outside of this range with different types of materials, air, environmental influences and/or constructions of pneumatic system. Control system 12 then determines, such as by measuring, a decayed pressure P3 after a decay time period T4. Control system 12 then calculates a rate of decay by calculating the change in pressure P2–P3 (the difference between the settled-in pressure and the decayed pressure) over the decay time period T4 (28) as measured just after the end of T3 or some time thereafter. A suitable decay time period T4 may also fall in a range of 30 seconds to several minutes. Ideally, the system is configured to confirm that the component will maintain a minimum pressure after stabilizing the system (after T3).

After the decay time period T4, control system 12 then deflates the component(s) of pneumatic system 16 to a specified deflation pressure P4 (28). Optionally, control system 12 then measures the time it takes to deflate the component(s) of pneumatic system 16 to deflation pressure P4 (30), which is referred to as a deflation time period T5. Further, control system 12 may then compare the deflation time period T5 to a second stored time T6 (31).

Figure 3:
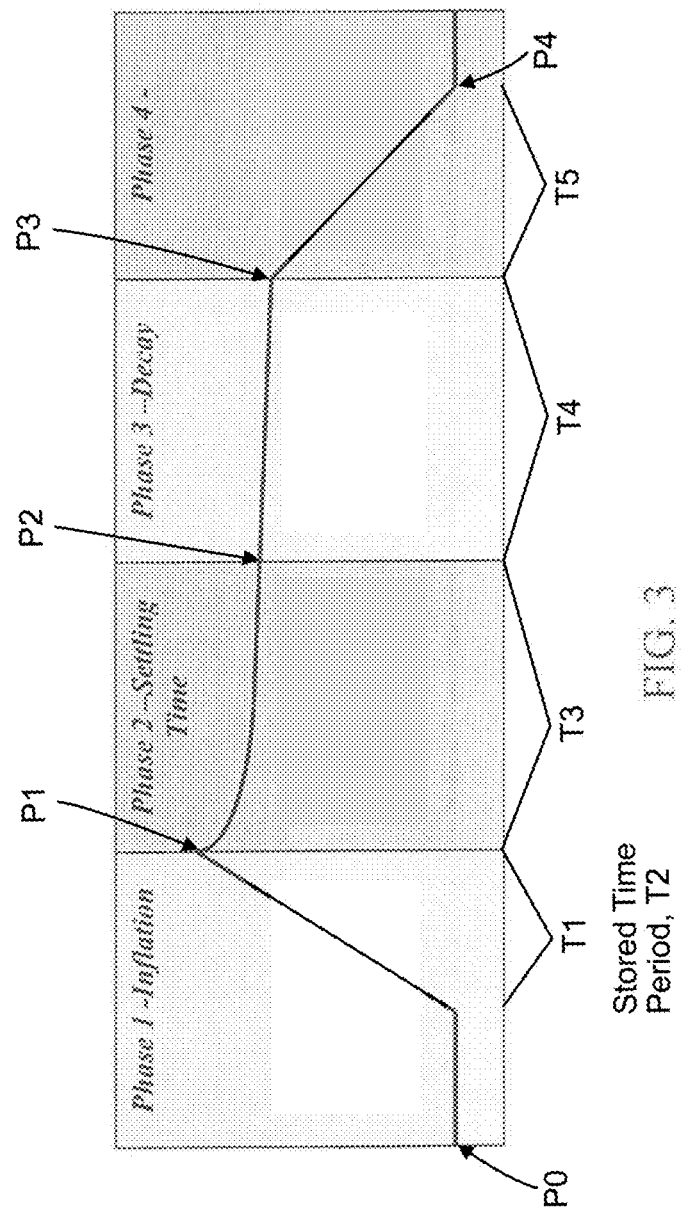
FIG. 3 is a graphical representation of the diagnostic process.

Referring to FIG. 3, the process described above is shown in a graphical form. For example, when diagnostic test 20 is initiated, the initial pressure may be zero or may start at an arbitrary or default pressure P0. Control system 12 then pressurizes or inflates the component or components of pneumatic system 14 to a specified inflation pressure P1. After the settling-in time period T3, control system determines the settled-in pressure P2. Control system 12 then measures a decayed pressure P3 after a decay time period T4 and determines a rate of decay in the pressure by calculating the change in pressure P2–P3 over the decay time period T4 (28) as measured just right after the end of settling-in time period T3 or some time thereafter. A suitable decay time period T4 may also fall in a range of 30 seconds to several minutes. Ideally, the control system 12 is configured to confirm that the component will maintain a minimum pressure after stabilizing the system (after T3).

After decay time period T4, control system 12 then deflates the component(s) of pneumatic system 16 to a specified deflation pressure P4 (28). Optionally, control system 12 then measures time it takes to deflate the component(s) of pneumatic system 16 from the decayed pressure to the specified deflation pressure P4 (30), which is referred to as a deflation time period T5. Further, control system 12 may then compare the deflation time period T5 to a second stored time period T6 (31).

Figure 3A:
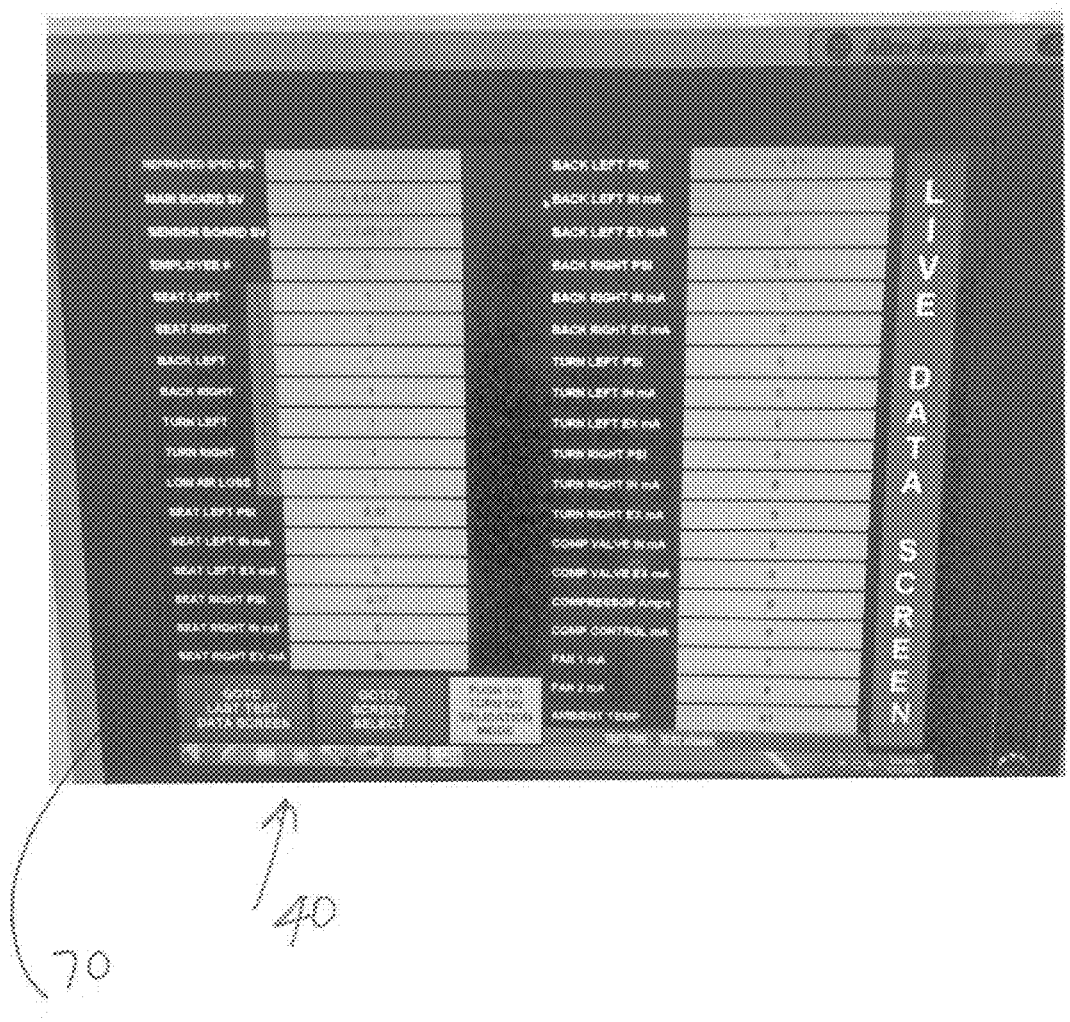
FIG. 3A is one embodiment of a display of the diagnostic system.

In each of the above noted comparison steps, control system 12 compares the determined or measured parameter to a stored parameter, e.g., a defined pressure stored in memory, a defined time period or a defined decay rate stored in memory, to determine, for example, whether the parameters are acceptable or exceed or are below the acceptable values. For example, referring again to FIGS. 1 and 3A, control system 12 may make a pass/fail determination based on the comparisons for each tested component. These determinations may be forwarded to a remote device, as noted above, such as a quality control system of a manufacturing facility or to a server, which may then forward the information, for example, on to a service company so that a technician may be sent on site to the pneumatic system to repair or replace the necessary component(s). Alternately, the results of the testing may be displayed at the pneumatic system or the apparatus incorporating the pneumatic system, as will be more fully described below.

In the illustrated embodiment, control system 12 comprises a display 40. Display 40 may be a touchscreen display capable of displaying text and/or graphics and sensing the location that a users finger touches the display. Although it will be understood that display 40 may be a normal LCD display without touchscreen capabilities that use hard or soft buttons to interact therewith, or still other types of displays. The information noted above may be transmitted to and displayed on display 40 in addition to the remote device(s) noted above or in place of the remote device. For example, when diagnostic system 10 is incorporated in to the pneumatic system, as noted above, the diagnostic system may be self-contained and simply display the results of the diagnostic test at the pneumatic system or at the apparatus incorporating the pneumatic system. Referring again to FIG. 3A, display 40 may be configured to display a variety of different information or data, including one or more of (a) pass/fail status of the inflation time to inflate the pneumatic system to the specified inflation pressure P1 (the inflation time period T1); (b) the pass/fail status of the rate of decay; (c) the pass/fail of the deflation time period T5; and (d) the pressure of the pneumatic system, and other parameters discussed below.

In addition to testing the pressure and the time it takes to achieve a specified pressure (the "time periods"), control system 12 may also be configured via software 14 to check the electrical components or system of the pneumatic system. For example, control system 12 may be configured to measure the current to the electrical components, such as valves, compressors, pumps, and/or internal fans of the pneumatic system. Control system 12 may then compare the measured current levels to specified current values for the respective component to determine whether any of the components are faulty, e.g., drawing too much or too little current.

Referring again to FIG. 1, in order for diagnostic system 12 to run the diagnostic test on pneumatic system 14, diagnostic system 12 may use the pump 18 (of the pneumatic system or its own pump) and valve 44 to direct the flow of fluid from the pump to the components of pneumatic system. In the illustrated embodiment, pneumatic system 16 comprises a mattress with one or more bladders 16a, 16b, 16c, and 16d. It should be understood that the number of bladders, the functions, and the configuration of the bladders may vary. Further, the bladders may be arranged in zones so that each zone may be tested, or the individual bladders in each zone may be tested.

For example, bladders (16a-16d) may form part of a patient support layer that provides support to a patient or may form part of a therapeutic system, such as turning bladder, percussion bladders, or vibration bladders or the like. Examples of mattresses with pneumatic systems that employ various bladders to support a patient and bladders to provide therapeutic functions, reference is made to U.S. Pat. No. 8,910,334 (STR03A-P239A), U.S. Pat. No. 8,911,387 (STR03A-P257A), and pending U.S. patent application Ser. No. 13/548,591 (STR03A-P376A) and Ser. No. 13/836,813 (STR03A P404A), which are commonly owned by Stryker Corporation of Kalamazoo, Michigan, and are incorporated by referenced in their entireties herein.

Diagnostic system 10 may be configured to run a diagnostic test on each bladder separately, simultaneously, or in succession. For example, for the pod like bladders described in the referenced patents and applications, an acceptable pressure decay rate may be in range of 0.10-0.15 psi/3 minutes, or in a range of 0.11-0.14 psi/3 minutes, or about 0.13 psi/3 minutes. An acceptable pressure decay rate for a turning bladder of the type described in the referenced patents and applications, which may be stored in memory, may be in range of 0.16-0.24 psi/3 minutes, or in a range of 0.18-0.22 psi/3 minutes, or about 0.2 psi/3 minutes.

When testing multiple bladders simultaneously or in succession, diagnostic system 10 may comprise multiple valves 44 (one or more for each bladder), which are in fluid communication with the respective bladder through one or more conduits. For example, valves 44 may be provided in the form of a valve manifold 48. A suitable valve manifold 48 may comprise solenoid valves, which may be in communication with the interface of the control system 12 either wirelessly or by hard wiring. In this manner, control system 12 can control the flow of fluid to each bladder (or zone) through one or more conduits. The conduits may be single lumen or double lumen conduits. For a reversible pump, inflation and deflation can be achieved through a single lumen. Separate lumens (inlet and outlet), however, are need for fluid communication with the outlet and inlet of the pump, respectively, in the case of a nonreversible pump or separate pumps in order to test each bladder. Although illustrated with a single conduit between each valve and each respective bladder, it should be understood that multiple conduits may be used to provide fluid communication between the valve(s) and the bladder(s). However, as noted, in the case of a non-reversible pump, additional conduits would need to be provided between the valves and the pump to provide both inflation and suction lines for inflating and deflating the bladders.

The pressure in the bladders may be measured, for example, by sensors provided at the respective valves 44 or may be measured by sensors 50a, 50b, 50c, 50d located in the respective bladders 16a-16d, or in inlets 52a, 52b, 52c, and 52d, or in the conduits directing fluid flow to and from the respective bladders. Control system 12 may be in electrical communication or wireless communication with the respective sensors (e.g. via the control system interface) to receive or read the sensor signals (or sensor states) to determine the pressure of each respective bladder and use those readings to perform the diagnostic test described above.

As noted above, diagnostic system 10 may be incorporated into the pneumatic system, including into a mattress. Referring to U.S. Pat. Nos. 5,542,136; 5,325,551; and 7,406,736 and U.S. pending applications U.S. patent application Ser. No. 13/548,591 (STR03A-P376A) and Ser. No. 13/836,813 (STR03A P404A), which are commonly owned by Stryker Corporation of Kalamazoo, Michigan, and are incorporated by referenced in their entireties herein, a mattress control system may be incorporated into the mattress and contained, for example, within the foot end of the mattress. As noted above, control system 12 may use the pump of the pneumatic system to run the diagnostic test. Further, control system 12 may use the valving of the pneumatic system to run the diagnostic test. Additionally, as noted, diagnostic system 10 may be formed as part of or retrofit into a mattress control system. In this manner, the control system may either be located, for example, in the foot end of the mattress along with the mattress control components (such as described in the referenced patents and patent publications) or may be included as a separate mattress control system either located, for example, in a pump box, such as disclosed in U.S. Pat. Nos. 5,542,136; 5,325,551; and 7,406,736, or into the apparatus supporting the mattress, as noted above, such as a hospital bed.

Figure 4:
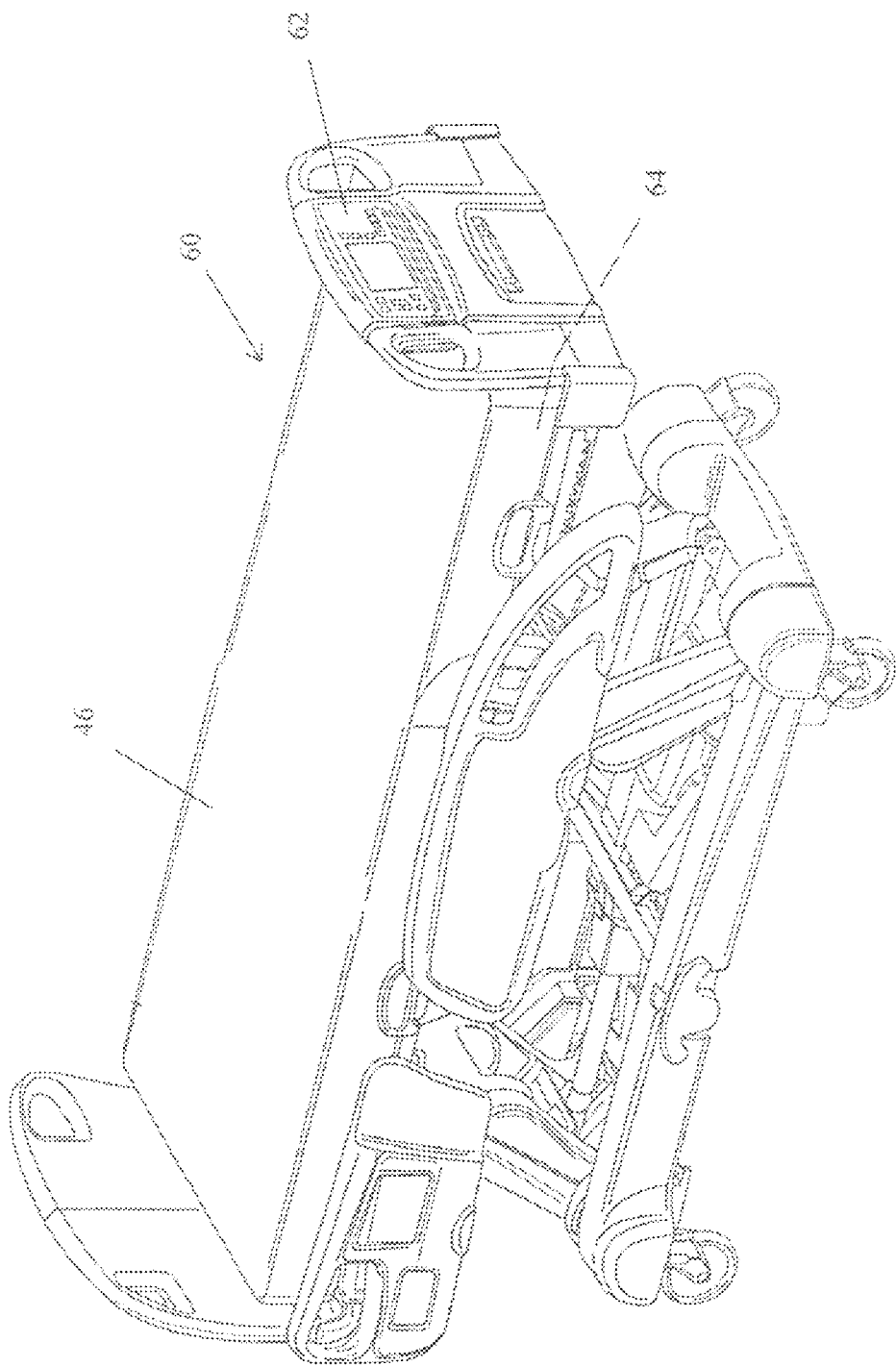
FIG. 4 is a perspective view of a patient support with a mattress.

For example, referring to FIG. 4, the numeral 60 designates a patient support apparatus in the form of a bed, such as a hospital bed. Diagnostic system 10 may be incorporated into the control system of the hospital bed. For example, diagnostic system 10 may be incorporated into a control module 62, such as a control module mounted in the footboard of the bed or in a pendant or in a bed control system 64 located beneath the mattress in the foot end of the deck of the bed. For further details of a suitable control module or foot end bed control system reference is made to U.S. Pat. No. 7,690,059 (STR03B-P-102A) and to U.S. Pat. No. 8,413,271 (STR03A-P190A), which are commonly owned by Stryker Corporation of Kalamazoo, Michigan, and are incorporated by referenced in their entireties herein. Further, the functions and/or information of display 40 may be incorporated into the displays of the bed or pendent, for example, the bed display may comprise a diagnostic screen with the status and/or information described herein in reference to the diagnostic test or tests described above.

In addition or alternately, as noted above, the diagnostic test result or results may be sent to a remote device for retrieval, storage, diagnostics, etc. The results may comprise other information, such as the bed identification, identification of the person running the diagnostic test (e.g., employee number), the date and time of the test, etc. Alternately or in addition, the diagnostic test results and information may be forwarded to a printer and printed, and for example, in a report, and/or forwarded, as noted, to a remote device for storage.

As noted above, diagnostic system 10 may comprise one or more interfaces, including a transceiver for communication with a remote device, including as noted a printer. The transceiver may be used by the controller for forwarding selected information from control system 12 to other devices, such as a quality control system or a manufacturing facility, but also to a computer network of a healthcare facility or another recipient, such as service provider who handles the repairs of the pneumatic system, such as the hospital bed and/or mattress noted above. The computer network may comprise an Ethernet network or can take on other forms.

In the case where the diagnostic system is separate from the pneumatic system, the control system interface may communicate with one or more electronic devices that are positioned on, or in the vicinity of, the pneumatic system. For example, in the case of a mattress, the interface may be configured to communicate with the mattress controller to thereby control, for example, the mattress pump (as noted above) and/or to receive signals from sensors already present in the mattress to thereby perform the diagnostic tests. Another suitable mattress is disclosed in commonly assigned U.S. patent applications Ser. Nos. 61/696,819 and 61/697,010, entitled INFLATABLE MATTRESS AND CONTROL METHODS and PATIENT SUPPORT, respectively, both of which were filed on Sep. 5, 2012, which are hereby incorporated herein by reference in their entireties. Such mattresses comprise a plurality of inflatable bladders whose inflation pressure is controllable by one or more controllers contained with the mattress. The mattress may further comprise a plurality of sensors used for detecting information about the status of the mattress, such as, but not limited to, one or more depth sensors, fluid pressure sensors, temperature sensors, patient interface pressure sensors, and/or humidity sensors. As such, the pressure sensors may be used by diagnostic system 10 to run the diagnostic tests described above.

In some embodiments, the interface is a Controller Area Network connection that communicates with the mattress, while in other embodiments, the interface takes on other forms. In one embodiment, the interface may be a wireless connection, such as that disclosed in commonly assigned U.S. patent application Ser. No. 13/296,656 filed Nov. 15, 2011 by applicants Guy Lemire et al. and entitled PATIENT SUPPORT WITH WIRELESS DATA AND/OR ENERGY TRANSFER, which is hereby incorporated herein by reference in its entirety.

In still other embodiments, control system 12 may comprise a near field communications transceiver that communicates in any of the manners, and with any of the devices, disclosed in commonly assigned U.S. patent application Ser. No. 13/802,992, filed Mar. 14, 2013 by applicants Michael Hayes et al, and entitled COMMUNICATION SYSTEMS FOR PATIENT SUPPORT APPARATUSES, which is hereby incorporated herein by reference in its entirety, as well as the sensors and pneumatic system components, such as the pump and valves, which would allow the control system 12 to use one or more of the components of the pneumatic system to run the testing. Such a near field communications transceiver may be also used for establishing an association between the diagnostic system and the pneumatic system, and optionally between the person testing the mattress, for example, a person wearing a near field ID tags. For example, an association can be established between the person running the test via a near field ID tag so that the patient support apparatus can record when and who did the testing.

Alternately, the software 14 may be located remotely, for example, on a network service server. In this embodiment, the controller of control system 12 may be configured to create a software environment in which one or more thin client applications are able to operate. Such thin client applications communicate with one or more network services, which are available on one or more remote networks, such as a manufacturing facility or service provider network and/or the Internet. The controller is therefore able to support one or more thin client applications where a substantial portion of the computational workload carried out by software application is done remotely via the one or more network services. The term "thin client" as used herein shall be given its ordinary and accustomed meaning in the field of computer science and software. In general, a thin client refers to a computer or computer program which depends substantially on another computer or, in this case, one or more network services, to fulfill its programmed computational functions.

However, it should be understood that the controller can be configured to support both fat and thin client applications, as well as applications that are purely local. In this manner, the diagnostic system for detecting leaks may be combined with other applications, including any one or more of the following: patient assessment applications (e.g. assessing a patient's risk of falls, assessing a patient's risk of bed sores, etc.); sensor monitoring and/or data collection applications (e.g. gathering load cells outputs—such as patient position, center of gravity, weight, weight distribution, patient movement, etc.—gathering pressure mat outputs, gathering vital sign readings, gathering data from medical devices associated with the support apparatus and/or the patient assigned to the support apparatus); maintenance monitoring/scheduling applications (e.g. monitoring the actual usage of various components on the support apparatus for maintenance purposes); billing applications (e.g. patient usage of the support apparatus features, medical device usage, patient presence on the support apparatus); and/or patient care protocol management applications (e.g. defining, implementing, and/or monitoring of patient care protocols, such as protocols for preventing patient falls, protocols for preventing bed sores, protocols for turning patients, protocols for preventing ventilator-associated-pneumonia (VAP), protocols for containing or reducing infections, etc.).

As noted above, diagnostic system 10 may include display 40. Optionally, software 14 may comprise an assessment display function that is performed by the controller, which carries out the display of any and all information associated with the diagnostic test. Referring again to FIG. 3A, the display may show the status of the test for each of the pneumatic components and the electrical components in a table form 70. The status may comprise a pass or fail indication for each bladder. Additional information, such as the pressure values for each bladder may also be included, as well as the current values for the electrical components of the pneumatic system. Additionally, the display function may control the display of any icons, menus, graphics, or other user interface items on display 40 that are used in the software application, for example, to initiate the testing protocol, to select between different windows, such as previous test information, such as in the form of tables. Alternately, or in addition, the controller may be in communication with a bar code reader so that the scanning of a bar code on the pneumatic system may be used to start the testing protocol or at least to upload the information about the pneumatic system being tested to the software.

Software 14 may also be configured, in some embodiments, gather and store the testing data for archival purposes or for use in comparison with a database containing actual failures or component breakdowns. In such embodiments, the data gathered from the application may be compared to the database of component failures to generate a maintenance schedule or to adjust an existing maintenance schedule based on the results of the comparison. Still further, mean times between failures of components in actual field use can be calculated, and this information can be used to set schedules and/or thresholds for preventive replacements of components prior to their breaking down so as to minimize down time.

When diagnostic system 10 is incorporated into a bed or mattress, diagnostic system 10 may be configured to run the test or tests automatically, for example, when the mattress is occupied or not. For example, the system may be configured to run the diagnostic testing only when the bed is empty and, therefore, may receive mattress occupancy signals as an input to the software to control the operation of the testing. Alternately, the software may run when the mattress is occupied, in which case the software may use the patient weight, and motion, as input to the system and adjust the pressure readings accordingly. In addition, diagnostic system 10 may be initiated remotely using the communication systems noted above.

Accordingly, diagnostic system 10 is configured to detect the pressure change in one or more components of a pneumatic system, and, moreover, detect the pressure change over a period of time to determine the rate of decay in the pressure in the component(s). Further, the system may determine how long the pneumatic system takes to reach a defined pressure, such as the inflation or deflation pressures noted above. The system may have multiple base line decay rate values stored in memory to compare the rate of decay and the time periods. As such, diagnostic system 10 may be used to detect small and large leaks in a pneumatic system. Based on the various tests run by system 10, system 10 may also be used to predict the expected life of the tested components, for example, based on projections of the values obtained by the testing and/or based on comparisons to values stored in the memory of the control system.

While several forms of the invention have been shown and described, various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This comprises, for example, presently known alternative elements, such as those that might be currently known to one skilled in the art, and alternative elements that may be developed in the future, such as those that one skilled in the art might, upon development, recognize as an alternative. Further, the disclosed embodiments comprise a plurality of features that are described in concert and that might cooperatively provide a collection of benefits. Also, as noted above the system of the present invention may be used on other pneumatic systems. Therefore, the present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of testing a bladder of a pneumatic mattress on a patient support for leakage, said method comprising:
providing a control system;
providing the control system with a sensor;
initiating a first test for detecting leakage by pressurizing the bladder to a first pressure with the control system;
during the first test for detecting leakage, sensing when the bladder has reached the first pressure with the sensor;
measuring an inflation time to reach the first pressure, the inflation time corresponding to a first time period;
comparing the inflation time to a stored acceptable inflation time value that corresponds to a second time period;
after reaching the first pressure of the first test for detecting leakage, the control system initiating a second test for detecting leakage that starts from the first pressure of the first test for detecting leakage, the second test including ceasing the pressurizing for a third time period greater than zero;
during the second test for detecting leakage, after the third time period has ended, the control system measuring a second pressure of the bladder with the sensor;
during the second test for detecting leakage, the control system measuring a fourth time period starting at the end of the third time period;
during the second test for detecting leakage, the control system sensing and measuring a third pressure with the sensor at the end of the fourth time period, the third pressure representing a reduced pressure from the second pressure of the bladder;
the control system determining a rate of change between the second pressure and the third pressure in the bladder over the fourth time period;
the control system comparing the rate of change to a stored value to determine whether there is a leak in the bladder; and
the control system generating a first signal when (1) the inflation time corresponding to the first time period is greater than the stored acceptable inflation time value corresponding to the second time period and generating a second signal when (2) the rate of change is greater than the stored value indicating a leak in the bladder.

2. The method according to claim 1, further comprising:
the control system determining whether the inflation time is greater, equal to, or less than the stored acceptable inflation time value; and
the control system displaying (1) whether the rate of change is greater than the stored value or (2) whether the inflation time is greater, equal to, or less than the stored acceptable inflation time value.

3. The method according to claim 1, further comprising the control system deflating the bladder to a non-zero fourth pressure after measuring the third pressure.

4. The method according to claim 3, further comprising:
the control system measuring a deflation time period for deflating the bladder to the non-zero fourth pressure after the fourth time period; and
the control system determining whether the deflation time period is greater, equal to, or less than a second stored time period.

5. The method according to claim 1, further determining whether the patient support is occupied, wherein the control system allowing the testing to be initiated only when the patient support is not occupied.

6. The method according to claim 1, further comprising the control system determining whether the rate of change is greater, equal to, or less than a second stored value.

7. The method according to claim 1, wherein:
said mattress includes a zone with a plurality of bladders, the plurality of bladders including the bladder, and said method of testing includes testing the zone with the plurality of bladders;
said pressurizing includes pressuring the zone with the plurality of bladders to a first pressure with the control system of the patient support;

said sensing includes sensing, with the sensor, when the zone with the plurality of bladders has reached the first pressure;

said measuring a second pressure includes measuring, with the sensor, a second pressure of the zone with the plurality of bladders;

said measuring a third pressure includes measuring a third pressure with the sensor at the end of the fourth time period, the third pressure representing a reduced pressure from the second pressure of the zone with the plurality of bladders;

said determining includes determining a rate of change between the second pressure and the third pressure in the zone with the plurality of bladders over the fourth time period;

said comparing includes comparing the rate of change to a stored value to determine whether there is a leak in the zone with the plurality of bladders; and said generating includes generating the second signal when the rate of change is greater than the stored value indicating a leak in the zone with the plurality of bladders.

8. The method according to claim 1, wherein said third time period is in a range of 30 seconds to several minutes.

9. A patient support comprising:
a mattress having a bladder;
a pneumatic system having a pump for inflating said bladder; and
a leak testing system comprising:
a control system, said control system having one or more memory devices and a sensor, said sensor detecting the pressure in said bladder, and said one or more memory devices comprising a non-transitory computer readable medium comprising stored code, said stored code configured to:
control said pump to pressurize said bladder;
initiate a first test for detecting leakage by directing said pump to pressurize said bladder to a first pressure;
measure, during the first test for detecting leakage, an inflation time to reach the first pressure;
compare the inflation time to a stored acceptable inflation time value, the inflation time corresponding to a first time period and the stored acceptable inflation time value corresponding to a second time period;
after reaching the first pressure of the first test for detecting leakage, initiate a second test for detecting leakage starting from the first pressure of the first test for detecting leakage and including ceasing the pressurization for a third time period greater than zero;
during the second test for detecting leakage, after the third time period, detect a second pressure in said bladder based on one or more signals from said sensor;
during the second test for detecting leakage, at the end of the third time period, measure a fourth time period;
during the second test for detecting leakage, at the end of the fourth time period, sense and measure a third pressure in said bladder, wherein the third pressure represents a reduced pressure from the second pressure;
determine a rate of change from the second pressure to the third pressure in said bladder over the fourth time period;
compare the rate of change to a stored value to determine if there is a leak in the bladder; and
generate a first signal when (1) the inflation time corresponding to the first time period is greater than the stored acceptable inflation time value corresponding to the second time period and a second signal when (2) the rate of change is greater than the stored value indicating a leak in the bladder.

10. The patient support according to claim 9, wherein said stored code is further configured to communicate the second signal when the rate of change is greater than the stored value.

11. The patient support according to claim 9, wherein said stored code is further configured to deflate pressure in said bladder to a non-zero fourth pressure after detecting the third pressure.

12. The patient support according to claim 11, wherein said stored code is further configured to: (1) measure a deflation time period for deflating pressure in the bladder to the non-zero fourth pressure; and (2) determine whether the deflation time period is greater, equal to, or less than a second stored time period.

13. The patient support according to claim 9, further determining whether the patient support is occupied, wherein said stored code is configured to initiate said pump to pressurize said bladder to the first pressure only when it is determined that the patient support is not occupied.

14. The patient support according to claim 9, wherein said bladder comprises a zone of bladders, and said control system for diagnosing said zone of bladders.

* * * * *